(12) United States Patent
Arai et al.

(10) Patent No.: US 7,048,268 B2
(45) Date of Patent: May 23, 2006

(54) WORKPIECE SUPPORTING DEVICE AND SEATING MECHANISM THEREFOR

(75) Inventors: Yoshihiro Arai, Chiryu (JP); Mitsuyoshi Taniguchi, Takahama (JP); Yasuo Niino, Hoi-gun (JP); Kiyotaka Kinoshita, Chiryu (JP); Kunimichi Nakashima, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 144 days.

(21) Appl. No.: 10/690,523

(22) Filed: Oct. 23, 2003

(65) Prior Publication Data

US 2005/0087919 A1    Apr. 28, 2005

(30) Foreign Application Priority Data

Oct. 25, 2002    (JP)    .............................. 2002-311308

(51) Int. Cl.
*B25B 1/22*    (2006.01)
(52) U.S. Cl. ...................... 269/296; 269/309; 269/329; 269/285; 269/286
(58) Field of Classification Search ................ 269/296, 269/20, 329, 285, 286, 309, 310
See application file for complete search history.

(56) References Cited

U.S. PATENT DOCUMENTS 5,305,992 A * 4/1994 Kish ........................... 269/51

2001/0020694 A1    9/2001  Makino et al.

FOREIGN PATENT DOCUMENTS

| JP | 7-24680 | 1/1995 |
|---|---|---|
| JP | 7-40169 | 2/1995 |
| JP | 7-40200 | 2/1995 |
| JP | 10-151537 | 6/1998 |
| JP | 11-223565 | 8/1999 |
| JP | 11-320305 | 11/1999 |
| JP | 2002-310813 | 10/2002 |

OTHER PUBLICATIONS

Patent Abstracts of Japan, JP 09-183033, Jul. 15, 1997.
Patent Abstracts of Japan, JP 08-229762, Sep. 10, 1996.
Patent Abstracts of Japan, JP 09-201742, Aug. 5, 1997.

* cited by examiner

*Primary Examiner*—Robert C. Watson
(74) *Attorney, Agent, or Firm*—Oblon, Spivak, McClelland, Maier & Neustadt, P.C.

(57) ABSTRACT

In order to detect accurately a seating of clamped body and a clamping force at a seating, the workpiece supporting device has plural seating mechanisms 40. Each of the seating mechanisms 40 includes a load sensing element 45 receiving a clamping force or a fixing force. The load sensing element 45 consists of a material having a characteristic that said load sensing element is not substantially deformed by an applied load, especially it consists of a composite material dispersing a material having a pressure resistance effect or a magnetic resistance effect in a matrix of an electric insulation ceramics material. An abnormal clamping or fixing of the clamped body and an abnormal overload are detected by detecting an output from plural load sensing elements 45 supporting the clamped body.

12 Claims, 6 Drawing Sheets

WORKPIECE SUPPORTING DEVICE AND SEATING MECHANISM THEREFOR

INCORPORATION BY REFERENCE

The present application claims priority under 35 U.S.C. §119 to Japanese Patent Application No. 2002-311308, filed on Oct. 25, 2002. The content of that application is incorporated herein by reference in their entirety.

BACKGROUND OF THE INVENTION

1. Field of the Invention

The present invention relates to a workpiece supporting device supporting a workpiece machined by a tool on a machine tool and also relates to a seating mechanism using for a clamped body. Especially, the present invention relates to the workpiece supporting device and the seating mechanism therefor to detect precisely a clamping force and overload acting on the clamped body.

2. Description of the Related Art

It is typically known for a workpiece supporting device to equip a clamping mechanism or a fixing mechanism for a workpiece and to have in this mechanism a load sensor detecting a clamping force or a fixing force acting on said workpiece. These related art of the workpiece supporting device are disclosed in Japanese Patent Laid-open Publication Nos. 7-40200, 8-229762, 9-183033, 10-151537 and 11-320305. It is disclosed in Japanese Patent Laid-open Publication No. 7-24680 for a workpiece supporting device to mount a strain gage on a fixing shaft and to detect a deformation strain acting on the fixing shaft in order to detect a fixing force. In these related art of the workpiece detecting device, three or more seating sheet members are mounted on a base and the workpiece supporting device or the fixing device disclosed in these Publications clamps the workpiece by contacting a reference surface of the workpiece to the seating sheet member. It is needed for a high accuracy of a machining that the reference surface is maintained to contact to the sheet member with a predetermined force. Japanese Patent Laid-open Publication Nos. 7-40169 and 9-201742 disclose a related art of a seating detection means to detect leakage of hydraulic flow from a discharging port opened on a top surface of the sheet member by a pressure sensor in a hydraulic circuit in order to detect a seating of the reference surface of the workpiece on the sheet member.

In the above-mentioned related art of the workpiece supporting device, since the detection of the seating depends on the leakage of hydraulic flow between the sheet member and the reference surface of the workpiece, accumulation of a machined chip on the sheet member or an abrasion of the sheet member affect malfunction against the detecting accuracy so that it must require an additional protector for said malfunction. More over, the seating mechanism based on the leakage of hydraulic flow can detect only whether the seating is but can not detect whether the clamping or fixing force to maintain the seating is adequate. The above-mentioned related art of the workpiece supporting device must need the seating detection means in addition to the clamping mechanism or the fixing mechanism with the load sensor to guarantee the clamping or fixing status of the workpiece by the predetermined force to the sheet member. If a load sensor will be mounted in the sheet member the load sensing means and the seat sensing means will be performed by one means, however, since the load cell or the strain gage is functioned by elastic deformation of a sensing body by the clamping or fixing force, a reference position is displaced by the clamping or fixing force to raise a decrease of the machining accuracy. In order to perform the high accuracy, it is needed to detect the seating of the workpiece on the work table by a suitable clamping force.

SUMMARY OF THE INVENTION

In view of the previously mentioned circumstances, it is an object of the present invention to provide a workpiece supporting device detecting both of an abnormal clamping and an abnormal overload.

It is second object of the present invention to provide a workpiece supporting device detecting both of an abnormal clamping and an abnormal overload with high accuracy.

It is third object of the present invention to provide a workpiece supporting device detecting an abnormal fixing, an abnormal overload and an abnormal seating with high accuracy.

It is fourth object of the present invention to provide a workpiece supporting device detecting an abnormal fixing, an abnormal overload and an abnormal seating with high accuracy best for a machine tool, especially a machining center.

It is fifth object of the present invention to provide the workpiece supporting device detecting the applied load value without deformation of a supporting position.

It is another object of the present invention to provide a controller for the workpiece supporting device.

It is other object of the present invention to provide the work supporting device with temperature compensation without affection of the temperature change.

It is more other object of the present invention to provide a seating mechanism for the workpiece supporting device detecting both of an abnormal clamping and an abnormal overload with high accuracy.

In order to achieve the above and other objects, the inventor of the present invention notices to the own invention of the International Patent Application No. WO 02/37037 relating to a load sensing element having a characteristics that it is not substantially deformed by an applied load thereon and adapts the load sensing element to a workpiece supporting device for a machine tool. Therefore, the present invention provides a workpiece supporting device comprising plural seating mechanisms disposed between a workpiece and a work table to support detachably the workpiece on the work table and each of the seating mechanisms includes a load sensing element assembled to receive said clamping force, said load sensing element is not substantially deformed by an applied load. Since the load sensing element having the characteristic substantially without deformation by the applied load is mounted in plural seating mechanisms to receive the clamping force, it can be detected not only an abnormal clamping but also an abnormal overload.

Second aspect of the present invention is that the workpiece supporting device comprises plural seating mechanisms disposed between the work table and a workpiece pallet, and each of the seating mechanisms includes the load sensing element assembled to receive the clamping force directly. The load sensing element can detect directly the clamping force to clamp the workpiece indirectly so that an accuracy of detecting the clamping force increase to detect both the clamping force and the abnormal overload with high accuracy. It is preferred to support a reference surface defined by an undersurface of the workpiece pallet by said three seating mechanisms disposed on a top of a triangle, or by said four seating mechanisms disposed on four corners of the reference surface.

Third aspect of the present invention is that the workpiece supporting device comprises a workpiece receiving unit mounted on the work table, a plunger mounted on the workpiece receiving unit for fixing the workpiece and plural seating mechanisms mounted on the workpiece receiving unit to support the workpiece, each of said seating mechanisms includes a load sensing element assembled to receive a fixing force fixing said workpiece directly. The load sensing element can detect directly the fixing force to clamp the workpiece directly so that an accuracy of detecting the fixing force increase to detect both the abnormal fixing force and the abnormal overload with high accuracy. Further more, the load sensing element installs on the workpiece receiving unit to directly support the workpiece so that the load sensing element can detect not only the abnormal clamping or fixing force and the abnormal overload but also an abnormal seating of the workpiece on the workpiece receiving unit It is preferred to support a reference surface defined by an undersurface of the workpiece by said three seating mechanisms disposed on a top of a triangle, or by said four seating mechanisms disposed on four corners of the reference surface.

Fourth aspect of the present invention is that the workpiece supporting device comprises a workpiece receiving unit fixed on the workpiece pallet, and plural seating mechanisms mounted on the workpiece receiving unit to support the workpiece, each of said seating mechanisms includes a load sensing element assembled to receive a fixing force fixing said workpiece directly. The load sensing element can be installed on the pallet usually and widely equipped on a machining center.

Fifth and sixth aspect of the present invention is that the load sensing element consists of a ceramics material so that the load sensing element receiving the applied load is not substantially deformed by the applied load. The elastic deformation of the ceramics material consisted the sensing element is 1.7 μm against 1,000 kgf of the applied load and this is very small against an allowable value 5 to 7 μm of a target machining accuracy. Especially, detecting the applied load by a pressure sensing body depends not on an elastic deformation of the sensing element but on a pressure resistance effect or a magnetic resistance effect of a pressure resistance effect material or a magnetic resistance effect material dispersed in a matrix of the ceramics material so that it can detect accurately the applied load value without substantially deformation of a supporting position against the clamping or the fixing force.

Seventh, eighth and ninth aspect of the present invention is that the workpiece supporting device further comprises a controller detecting the abnormal clamping by comparing a variation of an output value from the load sensing element included in plural seating mechanisms or detecting the abnormal overload during a machining. In the detecting of the abnormal clamping, the abnormal clamping is determined where the detecting value is under a threshold value. One example of a method of detecting the abnormal clamping is to compare sequentially each output from the sensing elements of plural seating mechanisms to the threshold defining a minimum clamping force to determine the abnormal clamping where there is one case of the seating mechanisms that the detecting value is under the threshold value. The other example of the method is to calculate an average value of all outputs from the load sensing elements of plural seating mechanisms to compare the calculated average value to a predetermined threshold value to detect the abnormal clamping where the average value is under the threshold value. These methods have a difference of the determination on the basis of each of outputs or all outputs but have the same purpose of detecting the abnormal clamping by detecting the output from plural load sensing elements. In detecting the abnormal overload, there are explained two examples of a method of the detecting. One example of the method is to calculate a maximum load difference between a minimum value and a maximum value of outputs from the load sensing elements of plural seating mechanisms to detect the abnormal overload where the difference is over a predetermined threshold value. The other example of the method is to determine if each output from the load sensing elements of seating mechanisms is within between a minimum threshold value and a maximum threshold value determining a suitable applied load to detect the abnormal overload. By these methods, it detects a value of a bias load acting on plural seating mechanisms, that is to say an unbalance of the clamping or the fixing force, to detect the abnormal overload by the value of the bias load.

Another aspect of the present invention is the workpiece supporting mechanism more further comprising the other load sensing element included in plural seating mechanisms and having the same sensing characteristic to said load sensing element for a temperature compensation to compensate the output from said load sensing element by an output from the other load sensing element included in the same seating mechanism. It is preferred for an accurate compensation of a temperature change in corresponding seating mechanism that each of all other load sensing elements is equipped as a pair to each of all said load sensing elements. If each of all other sensing elements can not be equipped to each of all said load sensing elements, two or more seating mechanisms separated from each other equip other load sensing elements for the temperature compensation to compensate the output from each of said load sensing elements by an average of outputs from the other load sensing elements.

Other aspect of the present invention is that a seating mechanism comprises a plunger and a load sensing element in a guide hole of a body, the load sensing element is received the applied load by the plunger or the load sensing element consisted the plunger receives directly the applied load. A pressure sensing elements consist of a composite material dispersed a material of a pressure resistance effect or a magnetic resistance effect in a matrix of the electric insulation ceramics material so that it can detect accurately the applied load value without substantially deformation of a supporting position against the clamping or the fixing force.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

Figure 1:
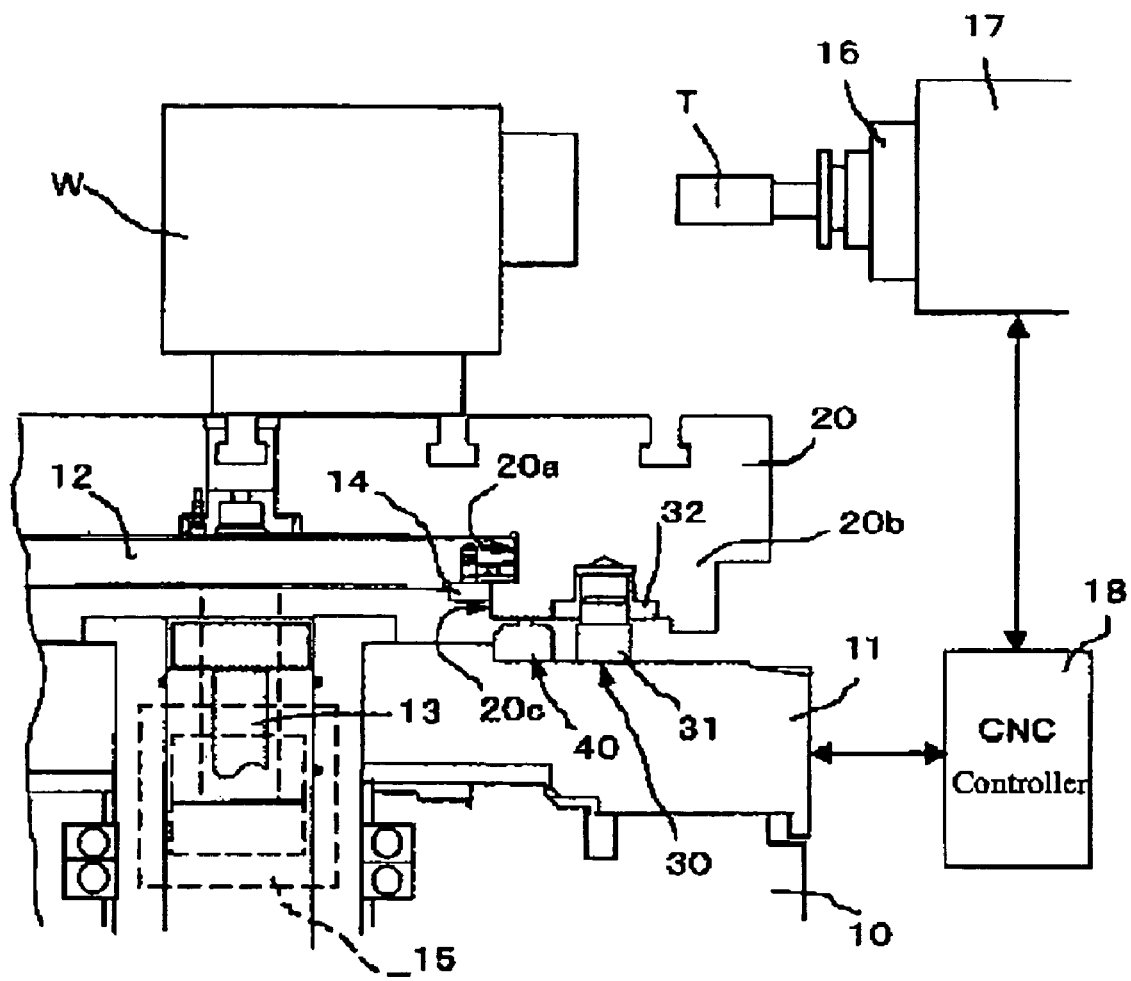
FIG. 1 is a cross-sectional side view of the main parts of a machining center for which a workpiece supporting device of the present invention is applied.

A preferred embodiment of first example of a workpiece supporting device and a seating mechanism therefor according to the present invention will be described referring to FIG. 1 to FIG. 5. FIG. 1 shows a cross sectional view of a main parts of a workpiece pallet supporting mechanism for a horizontal machining center with an automatic tool changer. In this figure, a numeral 10 shows a work table guided horizontally movably on an unillustrated bed in an X-axis direction vertical to an axis of a tool spindle 16 described hereinafter. On the work table 10 is supported a rotating table 11 indexable in a horizontal direction. On a rotating table 11 is detachably clamped a workpiece pallet 20, and a workpiece W is fixed by a well known fixing means such as a clamping fixture or a T-bolt etc. on the workpiece pallet 20. On the rotating table 11 is supported a pallet clamping board 12 movable up and down by a pair of cylinders 15 involved in the rotating table 11 in a vertical direction. In a center of the rotating table 11 is mounted a centering mechanism 13 including a center axis and a rotating distributor distributing hydraulic fluid and electric current between the work table 10 and the rotating table 11. The centering mechanism 13 guides an indexing operation of the rotating table 11, and a mechanism thereof is well known to be eliminated from a description. Said pair of cylinders 15 is disposed on both sides of the centering mechanism 12 in a perpendicular direction on a paper of FIG. 1. A rod of a movable piston in these cylinders 15 is fixed to a lower surface of the pallet clamping board 12. The pallet clamping board 12 is rectangular in viewing from upper side and a pair of opposite ends thereof are inserted into a T-shaped groove 20a formed on a lower surface of the pallet 20 to eliminate up and down movement of the pallet 20. A pair of foot portions 20b is also formed on the lower surface of the pallet 20 outside of and parallel to the T-shaped slot 20a. One of the foot portions 20b is not illustrated in FIG. 1. A plurality of guide rollers 14 is rotatably supported on under surfaces of said opposite ends along each of said opposite ends to guide an inner end surface 20c of the foot portions 20b of the pallet 20 when the pallet 20 is moved relatively to the work table 10 and the rotating table 11 in perpendicular direction to a plane of FIG. 1.

Figure 2:
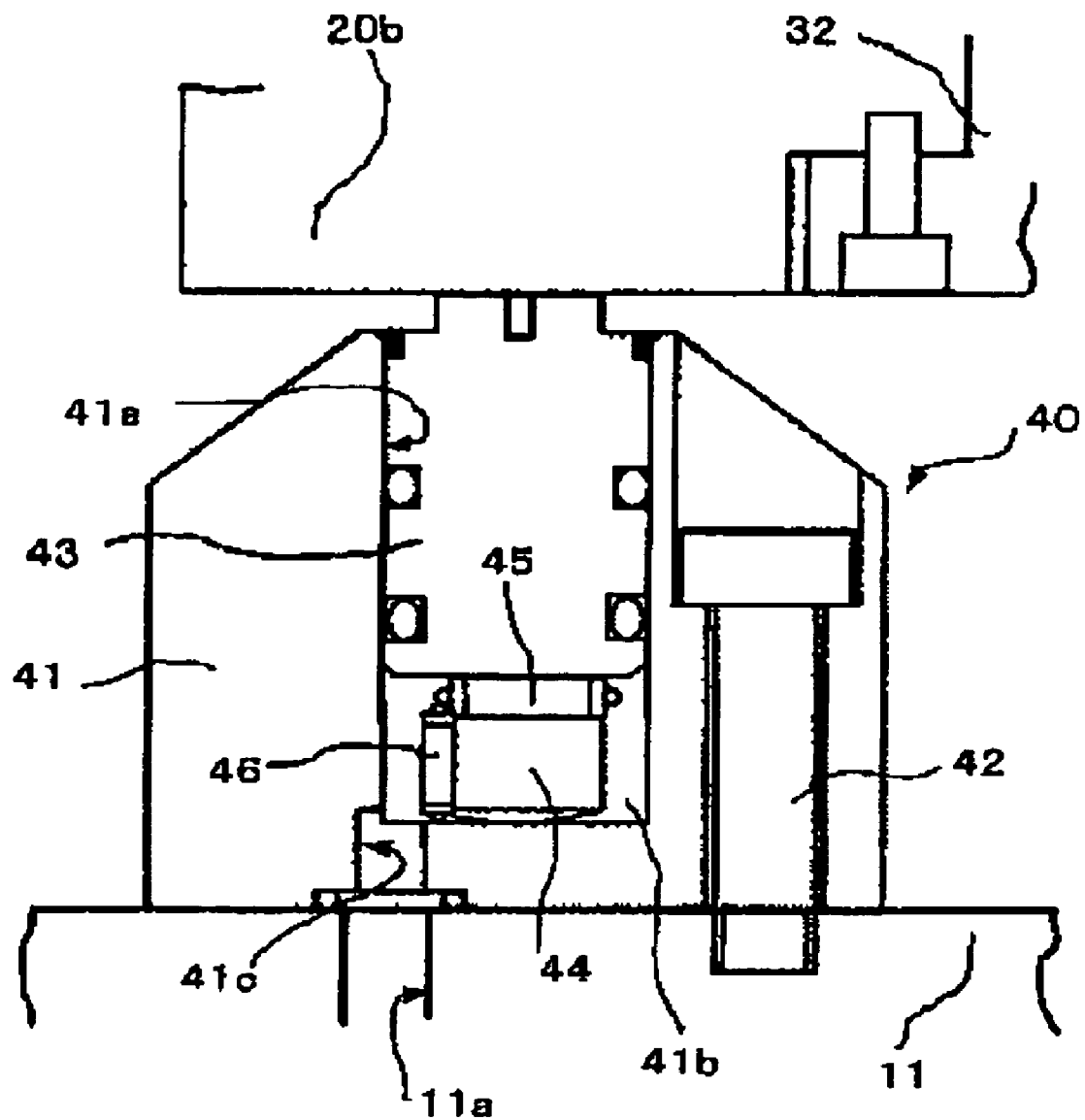
FIG. 2 is an enlarged cross-sectional side view of a seating mechanism of the workpiece supporting device.

In order to position horizontally and vertically the pallet 20 relative to the rotating table 11, two positioning mechanism are arranged between said pair of foot portions 20b of the pallet 20 and a respective portion on the rotating table 11 corresponding to the foot portions 20b. One is a pin mechanism 30 for the horizontal positioning and the other is a seating mechanism 40 for the vertical positioning Each pin mechanism 30 is placed in two positions horizontally opposite each other at a rotating center of the rotating table 11 to face to the foot portions 20b. The pin mechanism 30 comprises a positioning pin 31 fixed upwardly on the rotating table 11 and a sleeve 32 attached on the lower surface of the pallet 20 to have a pin hole receiving a top portion of the positioning pin 31. Each seating mechanism 40 is placed in four positions on the rotating table 11 to face to each both longitudinal ends of the foot portions 20b and is engaged with each of four corners of the pallet 20 to support the pallet 20 in upward and downward directions. FIG. 2 shows a detail of the seating mechanism 40. A body 41 of the seating mechanism 40 is fixed on the rotating table 11 by a bolt 42. In the body 41 is formed a vertical hole 41a through which a plunger 43 is penetrated up and down movably. A lower room 41b of the vertical hole 41a formed by a lower end surface of the plunger 43 is connected to a wiring passage 11a of the rotating table 11 through a wiring passage 41c. A receiving member 44 is arranged in the lower room 41b to seat a bottom surface of the vertical hole 41a by a spherical surface of the receiving member 44. There is a load sensing element 45 between a top surface of the receiving member 44 and the lower end surface of the plunger 43. Another load sensing element 46 for a temperature compensation is equipped on the side surface of the receiving member 44 by a suitable bonding material. Said another load sensing element 46 has the same sensing characteristic to the load sensing element 45. Each of both ends of the sensing elements 45, 46 are connected to a pair of leading wire wired into the rotating table 11 through the wiring passages 41c and 11a to be connected to unillustrated amplifier through the centering mechanism 13.

Figure 3:
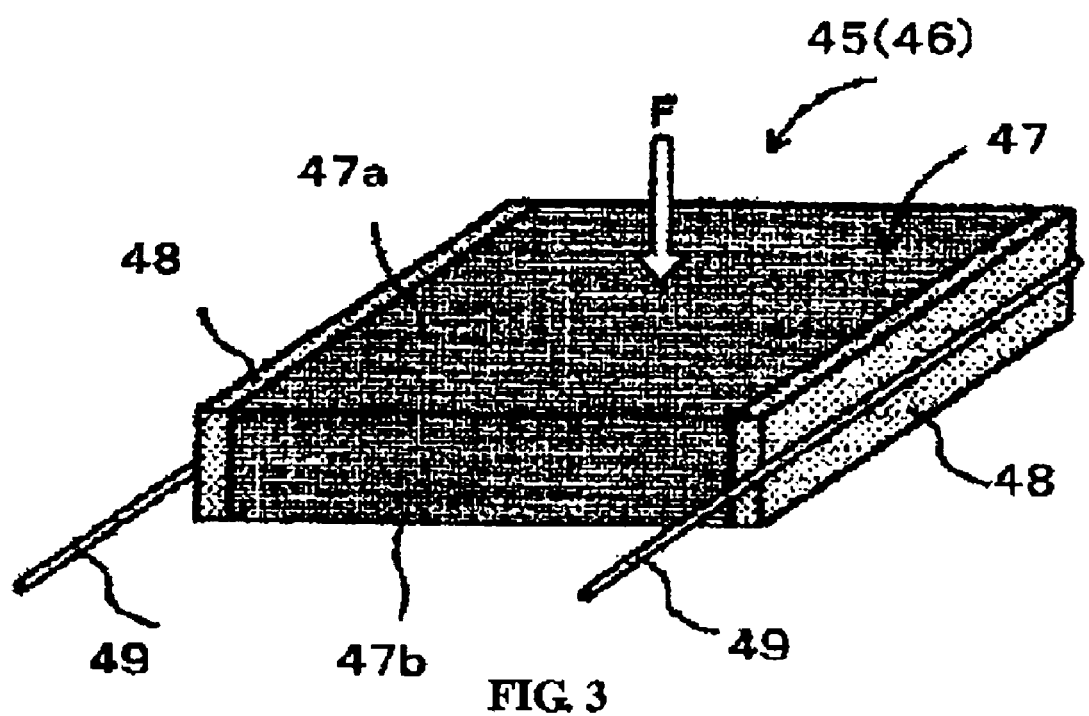
FIG. 3 is an enlarged explanatory diagram of an external appearance of a load sensing element installed in the seating mechanism.

The load sensing elements 45, 46 are constructed as shown in FIG. 3. Pair of electrodes 48, 48 are formed on a side surface of a rectangular pressure sensing body 47 as a unit. Leading wires 49, 49 are bound to the electrodes 48, 48 by a solder. Upper and lower surfaces 47a, 47b of the pressure sensing body 47 is formed to a flat surface as a pressure receiving surface positioned to be contacted to the lower surface of the plunger 43 and the top surface of the receiving member 44. The load sensing elements 45, 46 are composed of ceramics composite material having a small deformation substantially negligible against the applied load and detecting a strain of an inside composition as an electric output. The composite material is disclosed in the PCT application WO 02/37037 assigned as a co-applicant to the applicant of the present invention. However, in order to easily understand the contents of the present invention, the sensing element will be briefly explained in the next two columns.

Figure 4:
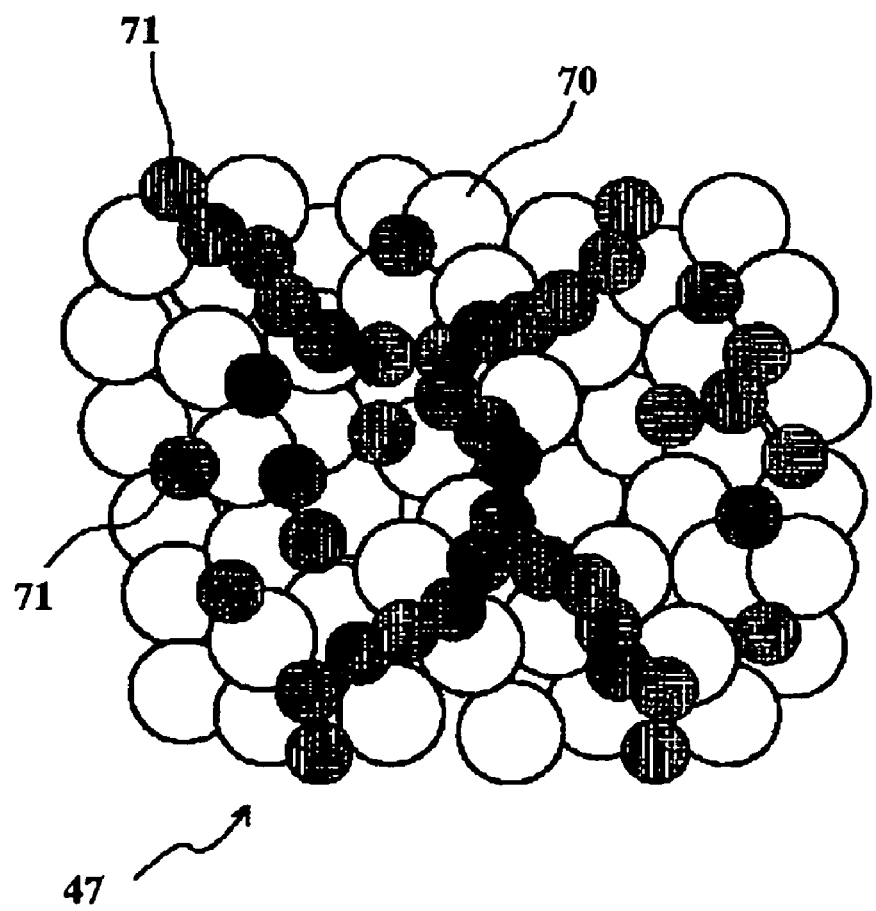
FIG. 4 is a schematic explanatory diagram of a construction of the load sensing element.

The composite material is produced by a dispersing material dispersing a filling material (called hereinafter as the pressure resistance effect material) having a pressure resistance effect or a magnetic resistance effect on a matrix composed of an electric insulation ceramics material. A compressive strength of the electric insulation ceramics material is intensified to increase a total strength of a whole sensing element so that a high applied load can be received directly by the composite material itself. FIG. 4 shows schematically the structure of the pressure sensing body 47 and in an actual composite material of the pressure sensing body 47, respective particles of the electric insulation ceramics material 70 and respective particles of the pressure resistance effect material 71 exist in sintering condition. The matrix disperses the pressure resistance effect material 71 in the stage that they electrically continued in order to make the pressure resistance effect or the magnetic resistance effect. At least one of receiving surface of the pressure sensing body 47 is preferred to equip an insulator having an electric insulation and the insulator can be sintered with the pressure sensing body or can be formed separately to be bonded them by a bond and so on. The electric insulation ceramics constituting the pressure sensing body 47 is preferred to be made of zirconia. The zirconia described here includes various kinds of addition agents to $ZrO_2$ to refer to substances including such various compositions as $3Y$—$ZrO_2$ and $12Ce$—$ZrO_2$. Zirconia has the high strength and the electric insulation to be a good for a constructing material in the matrix. As the ceramics for the matrix, the ones having following materials can be used as well as zirconia, that is it is permissible to employ $Al_2O_3$, $MgAl_2O_4$, $SiO_2$, $3Al_2O_3$, $2SiO_2$, $Y_2O_3$, $CeO_2$, $La_2O_3$, $Si_3N_4$ and the like. As material having the above-mentioned pressure resistance effect or magnetic resistance effect, it is preferred to use any one or more of perovskite structured $(Ln_{1-x}Ma_x)_{1-y}MbO_{3-z}$, layered perovskite structured $(Ln_{2-u}Ma_{1+u})_{1-v}Mb_2O_{7-w}$, Si and substance produced by adding a small amount of addition element to these (here, $0<x=0.5$, $0=y=0.2$, $0=z=0.6$, $0<u=1.0$, $0=v=0.2$, $0=w=1.0$, Ln: rare earth element, Ma: one or more alkaline earth element, Mb: one or more transition metal element).

A manufacturing process of the pressure sensing body 47 consisting of the composite material will be described. As the electric insulation ceramics material 70, $ZrO_2$ added 12 mol % $CeO_2$ is employed and as the pressure resistance effect material 71, $La_{0.75}Sr_{0.25}MnO_3$ is employed. First, $La_2O_3$ powder, $SrCO_3$ powder, $MnCO_3$ powder were weighed such that composition ratio of La, Sr, Mn was 0.8:0.2:1. Those powders were thrown into a polyethylene pot together with mixing $ZrO_2$ ball and mixing solvent ethanol and mixed for 20 hours. The mixed powder was dried and crushed and then, sintered preliminarily at 1,300° C. for four hours in the atmosphere, so as to produce perovskite complex oxide powder $La_{0.75}Sr_{0.25}MnO_3$. Subsequently, $ZrO_2$ powder added marketed $CeO_2$ (Sumitomo Osaka Cement Co., Ltd., OZC-12CEB) and synthesized $La_{0.75}Sr_{0.25}MnO_3$ powder were weighed such that the weight ratio of $La_{0.75}Sr_{0.25}MnO_3$ with respect to the entire weight was 26 weight %. These powders were thrown into the polyethylene pot together with mixing $ZrO_2$ ball and mixing solvent ethanol and mixed for four hours, and then dried and crushed. The crushed mixing powder was formed by pressing with a mold into a disk of 18 mm in diameter and after that, subjected to CIP processing under a pressure of 3,000 $kg/cm^2$. Then, the formed body was sintered at 1,400° C. for four hours. An obtained sintered body has the electrical conductivity and a density 98% as fine as the theoretical density thereof. A resistance ratio of the sintered body was about 25 Ocm. The pressure sensing body 47 is obtained by cutting this sintered body into rectangular solids. In this pressure sensing body 47, a pair of the opposing surfaces is the pressure receiving surfaces 47a and 47b. The electrodes 48, 48 were disposed on each of a pair of side surfaces perpendicular to these pressure receiving surface 47a, 47b. The electrode 48 was baked with Ag paste (Shoei Chemical Inc., H-5997) by maintaining it at 850° C. for 10 minutes. A lead wire 49, 49 were disposed on the electrodes 48, 48 by soldering. Consequently, the load sensing elements 45, 46 are manufactured.

Figure 5:
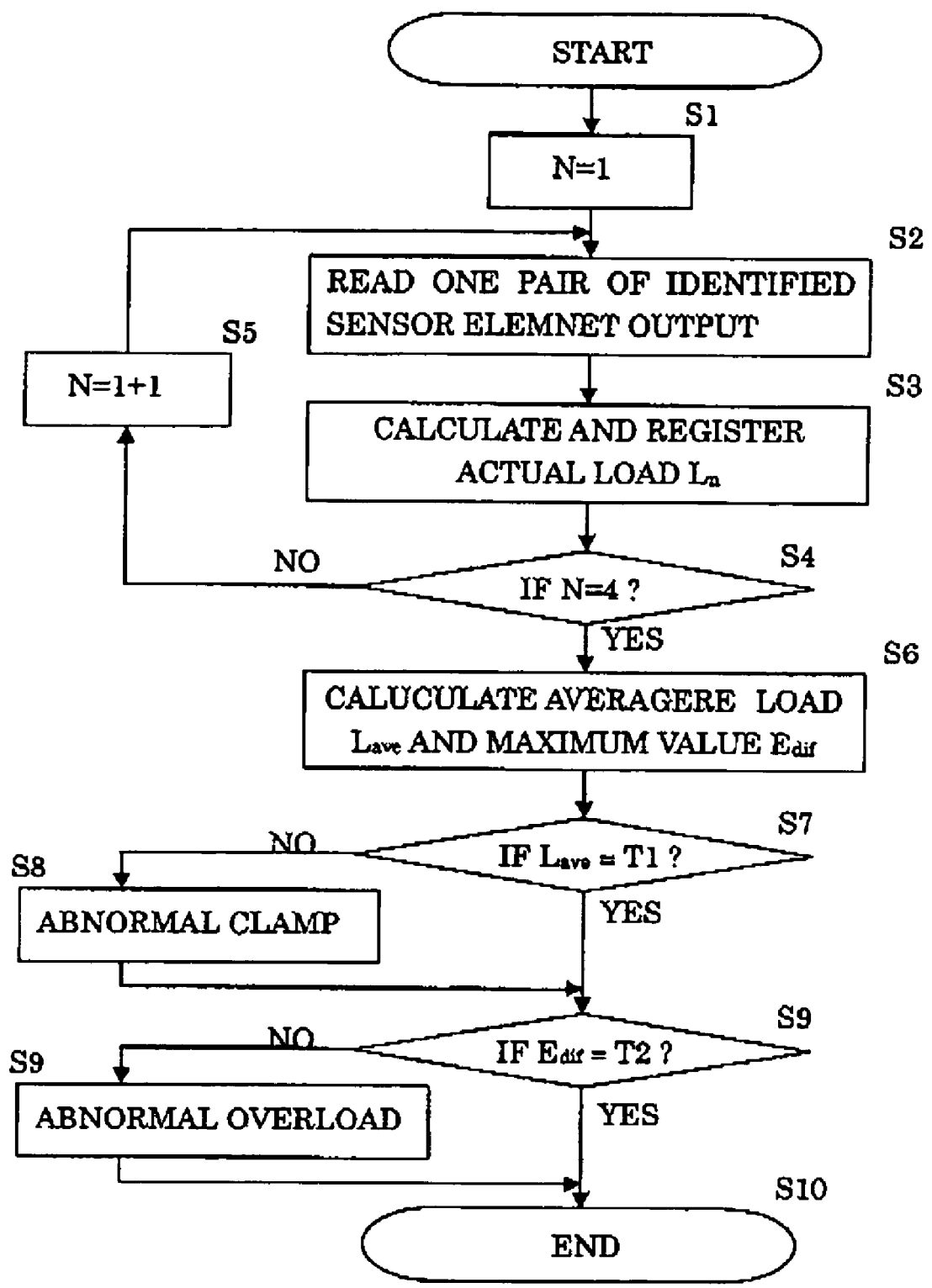
FIG. 5 is a flow chart showing a process routine to detect an abnormal clamping and an abnormal overload by a CNC controller of the machining center based on an output from the load sensing element.

FIG. 5 shows a flow chart of application control example executed by a CNC controller 18 for the machining center after receiving outputs from four pairs of load sensing elements 45, 46 of four seating mechanisms 40 disposed at positions corresponding to four corners of the lower surface of the workpiece pallet 20. The operation of the workpiece supporting device constructed above will be explained hereinafter referring to the flowchart.

The pallet 20 holding the workpiece W is loaded on the rotating table 11 by a well known pallet changer in the state that the pallet clamping board 12 is elevated to an unclamping position where the sleeve 32 is apart from the positioning pin 31. The pallet clamping board 12 introduces the pallet 20 by the way of guiding the inner surface 20c of the foot portion 20b of the pallet 20 by plural rollers 14 and the board 12 is inserted into the T-shaped groove 20a of the pallet 20. After the pallet 20 is inserted into the predetermined position corresponding to the pallet clamping board 12, the pallet clamping board 12 is lowered by the lowering operation of the one pair of cylinders 15. The sleeves 32 insert the positioning pins 31 therein and the lower surfaces of the foot portions 20b contact the top surfaces of the plungers 43 of the seating mechanism 40 disposed at the positions corresponding to four corners of said lower surfaces to clamp the pallet 20 on the rotating table 11. A compressing force of about 1,000 kgf acts on each of four plungers 43, the compressing force acts directly on the load sensing element 45 held between the plunger 43 and the receiving member 44. The compressing deformation amount of the load sensing element 45 by 1,000 kgf is about 1.7 μm (micron meter). Since a required machining accuracy for the machining center is about 5 μm, the compressing deformation amount of the load sensing element 45 is small enough to be substantially eliminated compared to the required machining accuracy. A reference surface of clamping the workpiece W is, therefore, lowered 1.7 μm compared to the prior art clamped on a fixed seating member, but the lowering amount is within allowable accuracy of the positioning to be substantially eliminated. The clamping state of the pallet 20 is maintained during the machining of the workpiece. In the machining center during the machining, an unillustrated column of the machining center is moved horizontally along Z axis, the spindle head 17 is moved vertically on the column along Y axis and the work table 10 is moved horizontally along X axis perpendicular to the Y and Z axes to achieve the three dimensional machining. The CNC controller 18 controlling the operation of the machining center performs control routine shown in FIG. 5 at predetermined interval such as 10 m sec. (millisecond) and to detect an abnormal clamping and an abnormal overload.

Referring to FIG. 5, initial value "1" is set in counter N identifying one of four seating mechanism 40 in step S1. In step S2 is read outputs from the load sensing element 45 of the seating mechanism 40 and outputs from the load sensing element 46 for the temperature compensation. The output from the load sensing element 45 is compensated by an unillustrated bridge circuit using the output from the load sensing element 46 for the temperature compensation and amplified by an unillustrated amplifier to calculate an actual load $L_a$ and to be registered and renewed in a predetermined memory area in step S3. These processes are continued to perform all of four seating mechanisms 40 in step S4 and S5. It is judged if four actual clamping loads $L_1$ to $L_4$ acting on four seating mechanisms 40 are registered or not in step S4. When the judgment is YES, an average actual load $L_{ave}$ and a maximum actual load difference $E_{dif}$ are calculated in step S6, where the average actual load $L_{ave}$ is an average of these actual loads $L_1$ to $L_4$ acting on four seating mechanisms 40 and the maximum actual load difference $E_{dif}$ is a difference between maximum and minimum amounts of these actual loads $L_1$ to $L_4$. The averaging actual load $L_{ave}$ is compared to a first threshold value T1 defining an essential minimum clamping force in step S7. In step S8, an abnormal signal of the pallet clamping is output where the average actual load $L_{ave}$ is under the first threshold value T1. The maximum actual load difference $E_{dif}$ is compared to a second threshold value T2 defining an allowable value of clamping force difference in four seating mechanisms 40 in step S9. In step S10, an abnormal overload signal is output where the maximum actual load difference $E_{dif}$ is over the second threshold value T2. At the maximum machining load, some of four seating mechanisms 40 are received larger load than the load at a non-machining and some of four seating mechanisms 40 are received smaller load than the load at the non-machining. Therefore, a bias load making an unbalance acts on the four corners of pallet 20 to be detected an overload on the basis of the value of the bias load. When the abnormal overload or the abnormal clamping is detected, the CNC controller 18 performs necessary process such as a decreasing of relative movement velocity between the spindle head 17 and the work table 10, a stopping of the movement or an informing of abnormal signal turning on an abnormal lamp. This control process is one example of possible control processes for using the detecting signal from the seating mechanism 40 and other various control process can be performed to use the detecting signal.

Figure 6:
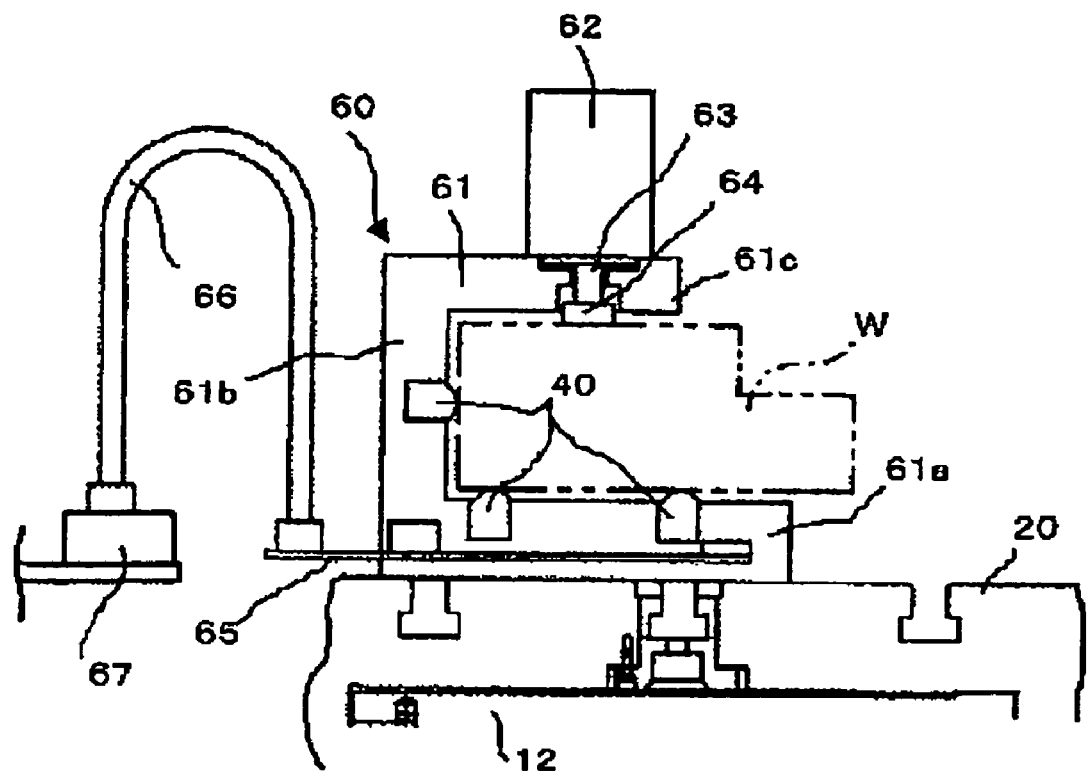
FIG. 6 is an enlarged cross-sectional side view of a second embodiment of the workpiece supporting device of the present invention.

A second embodiment of the present invention will be described hereinafter referring to FIG. 6. In this second embodiment of the present invention, the seating mechanism 40 disclosed in the first embodiment is applied to a workpiece receiving unit 60 with an automatic fixing mechanism mounted on the pallet 20 in order to contact directly to the workpiece W. Four or more seating mechanisms 40 are disposed on a C-shape flame 61 or a horizontal base 61*a* with an upward position of the top surface of the plunger 43 to support four corners of an under surface of the workpiece W. Further, two or more seating mechanisms 40 are disposed on a vertical portion 61*b* of the flame 61 with a horizontal position of the top surface of the plunger 43 separated in a perpendicular direction of a plane of FIG. 6 to support a side surface of the workpiece W opposite to a tool T. On a ceiling plate 61*c* of the flame 61 is mounted a cylinder 62 as a fixing actuator. A fixing member 64 is mounted on a lower end of a piston rod 63 in the cylinder 62 to move downwardly by hydraulic pressure in order to fix the workpiece W against the top surface of the plunger 43 of the seating mechanism 40 mounted on the horizontal base 61*a*. A lead wire guide box 65 is mounted on the horizontal base 61*a* of the flame 61. A lead wire is guided by the guide box 65 and a flexible pipe 66 with a reversed U-shape connected to the guide box 65.

An operation of this second embodiment of the present invention will be described hereinafter. The CNC controller 18 executes the aforementioned control flowchart at a pre-determined interval and operates to detect the status of the abnormal clamping and the abnormal overload. Whereby, the N number in the flowchart of FIG. 5 is set according to a number of the seating mechanisms 40 disposed on the flame 61. And also, before the operation of the flowchart, the CNC controller 18 can detect an abnormal seating of the workpiece W on the workpiece supporting unit 60 because the workpiece W is directly contact with the seating mechanisms 40 when the workpiece W is seated. The second embodiment of the present invention can detect the abnormal overload during the machining, and also detect the abnormal seating of the workpiece W and the abnormal clamping, that is an abnormal fixing in the second embodiment, by the cylinder 62 on the basis of the output from the load sensor 45 included in the seating mechanism 40 so that it is not needed to provide both of the seating detection means and clamping detection means as a conventional apparatus.

While the invention has been described in detail with reference to the preferred embodiment, it will be apparent to those skilled in the art that the invention is not limited to the present embodiment, and that the invention may be realized in various other embodiments within the scope of the claims.

For example, the present invention is explained these embodiments for the pallet clamping mechanism and the workpiece fixing unit of the machining center but it is applicable to any other machine tools equipping a table with the workpiece or a workpiece holding jig such as a grinding machine, a press, a shaping machine and so on. The workpiece receiving unit 60 is mounted on the workpiece pallet 20 in the second embodiment of the present invention, however it can be mounted directly on the rotating table 11 without the workpiece pallet 20 or on the worktable 10 without the workpiece pallet 20 and the rotating table 11.

Figure 7:
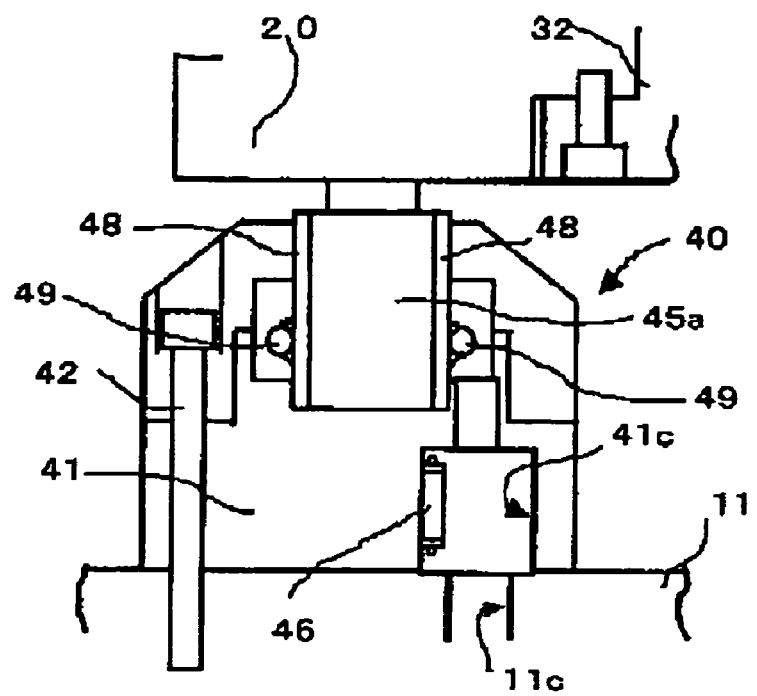
FIG. 7 is an enlarged cross-sectional side view of another embodiment of the seating mechanism.

In the above-mentioned embodiments, the seating mechanisms 40 have the construction of the load sensing element 45 between the plunger 43 and the receiving member 44, referring to FIG. 7, however, it can be constructed that the plunger itself consists of a load sensing material directly contacting to the workpiece W or the pallet 20 by a top of the load sensing element 45. This FIG. 7 shows that the load sensing element 45 is a rectangular cross section and long length in a vertical direction and that the sensing element 45 is inserted into a rectangular hole.

Figure 8:
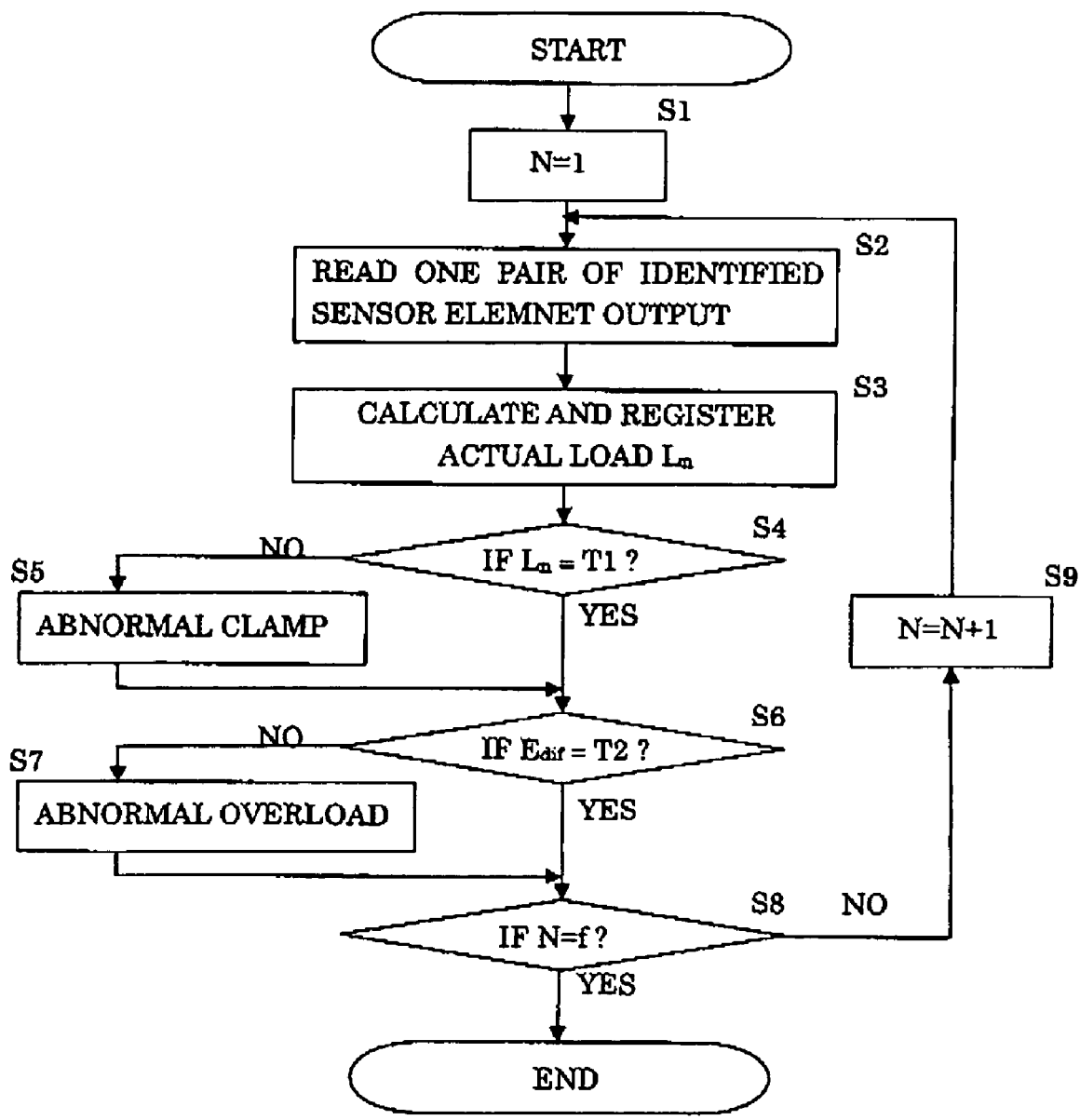
FIG. 8 is a flow chart showing another embodiment of a process routine to detect the abnormal clamping and the abnormal overload by the CNC controller of the machining center based on the output from the load sensing element.

In the above-mentioned embodiments, the average load $L_{ave}$ acting on all seating mechanisms 40 is calculated in step S6 of FIG. 5 and compared with the first threshold value T1 defining the lowest need clamping force in step S7, referring to FIG. 8, however, it can be processed that each of load acting on all seating mechanisms 40 is sequentially compared to the first threshold value T1 in step S4 of FIG. 8. In the aforementioned embodiments, the maximum actual load difference $E_{dif}$ acting on all seating mechanisms 40 is calculated in step S6 of FIG. 5 and compared to the second threshold value T2 defining the allowable value between clamping differences of the seating mechanisms 40 in step S9, referring to FIG. 8, however, it can be processed that each load acting on the seating mechanisms 40 is judged whether it is between a minimum threshold T3 and a maximum threshold T4 in step S6 of FIG. 8, and the abnormal overload signal is generated when it is not between these threshold T3 and T4. This process is continued to recognize a performance about a final number "f" of the seating mechanisms 40 in step S8 of FIG. 8.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. A workpiece supporting device including a work table relatively movable to a tool and supporting a workpiece, and a clamping member clamping said workpiece relative to said work table, said workpiece supporting device comprising:

plural seating mechanisms disposed between said workpiece and said work table to support detachably said workpiece on said work table; and each of said seating mechanisms includes a load sensing element assembled to receive said clamping force, wherein said load sensing element is not deformed by more than 5.0 µm by an applied load.

2. A workpiece supporting device including a work table relatively movable to a tool, a workpiece pallet supporting a workpiece, and a clamping member clamping said workpiece pallet on said work table, said workpiece supporting device comprising:

plural seating mechanisms disposed between said workpiece pallet and said work table to support detachably said workpiece pallet on said work table to support indirectly said workpiece; and each of said seating mechanisms includes a load sensing element assembled to receive said clamping force directly, wherein said load sensing element is not deformed by more than 5.0 µm by an applied load.

3. A workpiece supporting device according to one of claims 1 to 2, wherein said load sensing element consists of a ceramics material.

4. A workpiece supporting device according to one of claims 1 to 2, wherein a pressure sensing body of said load sensing element consists of a composite material dispersing a filling material in a matrix;

said filling material has a pressure resistance effect or a magnetic resistance effect; and said matrix consists of an electric insulation ceramics material.

5. A workpiece supporting device according to one of claims 1 to 2, wherein said workpiece supporting device further comprising:

a controller detecting an abnormal clamping or an abnormal fixing clamping said workpiece relative to said work table and outputting a control signal; and said controller reads an output from said load sensing element included in said plural seating mechanisms and compares each value of said output or an average value of said output to a predetermined first threshold value to detect said abnormal clamping.

6. A workpiece supporting device according to one of claims 1 to 2, wherein said workpiece supporting device further comprising:

a controller detecting an abnormal overload during a machining by said tool and outputting a control signal; and said controller reads an output from said load sensing element included in said plural seating mechanisms and compares each value of said output or an maximum difference of outputs to a predetermined second threshold value to detect said abnormal overload.

7. A workpiece supporting device according to one of claims 1 to 2, wherein said workpiece supporting device further comprising:

a controller detecting an abnormal clamping or an abnormal fixing clamping said workpiece relative to said work table and an abnormal overload during a machining by said tool and outputting a control signal; and said controller reads an output from said load sensing element included in said plural seating mechanisms and compares each value of said output, an average value of said output or an maximum difference of outputs to a predetermined first and a second threshold values to detect said abnormal clamping or fixing and said abnormal overload.

8. A workpiece supporting device according to claim 5, wherein said workpiece supporting device further comprising:

an another load sensing element included in at least two or more seating mechanisms and having the same sensing characteristic to said load sensing element for a temperature compensation to compensate said output from said load sensing element by an output from said another load sensing element included in the same seating mechanism.

9. A seating mechanism for a machine tool supporting a workpiece machined by a tool, wherein said seating mechanism comprising:

a body having a guide hole;

a plunger inserted into said guide hole and contacting to a reference surface of said workpiece by one end of said plunger to support said workpiece;

a load sensing element inserted into said guide hole and contacting to the other end of said plunger to detect clamping force acting on said plunger;

said load sensing element includes a pressure sensing body consisting of a composite material dispersing a filling material in a matrix so that said load sensing element is not deformed by more than 5.0 µm by an applied load;

said filling material has a pressure resistance effect or a magnetic resistance effect; and said matrix consists of an electric insulation ceramics material.

10. A seating mechanism for a machine tool supporting a workpiece machined by a tool, wherein said seating mechanism comprising:

a body having a guide hole;

a plunger inserted into said guide hole and contacting to a reference surface of said workpiece by one end of said plunger to support said workpiece;

said plunger includes a pressure sensing body consisting of a composite material dispersing a filling material in a matrix so that said load sensing element is not deformed by more than 5.0 µm by an applied load;

said filling material has a pressure resistance effect or a magnetic resistance effect; and said matrix consists of an electric insulation ceramics material.

11. A workpiece supporting device according to claim 6, wherein said workpiece supporting device further comprises:

an another load sensing element included in at least two or more seating mechanisms and having the same sensing characteristic to said load sensing element for a temperature compensation to compensate said output from said load sensing element by an output from said another load sensing element included in the same seating mechanism.

12. A workpiece supporting device according to claim 7, wherein said workpiece supporting device further comprises:

an another load sensing element included in at least two or more seating mechanisms and having the same sensing characteristic to said load sensing element for a temperature compensation to compensate said output from said load sensing element by an output from said another load sensing element included in the same seating mechanism.

* * * * *